R. HÖGBERG.
POTATO MILL.
APPLICATION FILED JUNE 9, 1913.
1,168,809.
Patented Jan. 18, 1916.
2 SHEETS—SHEET 1.
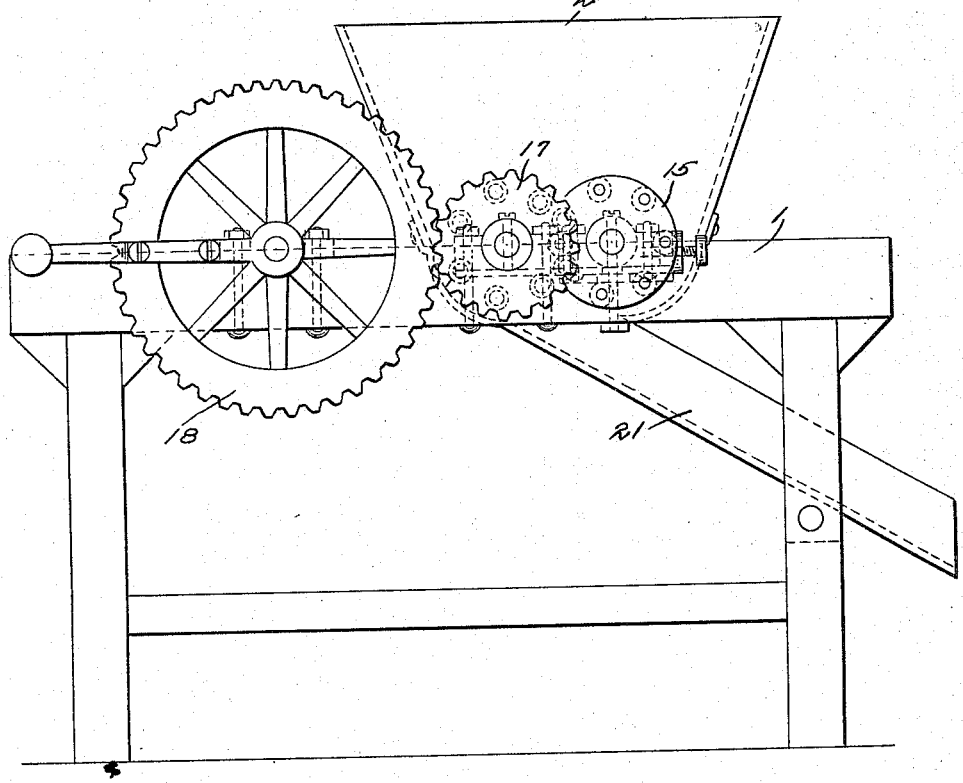
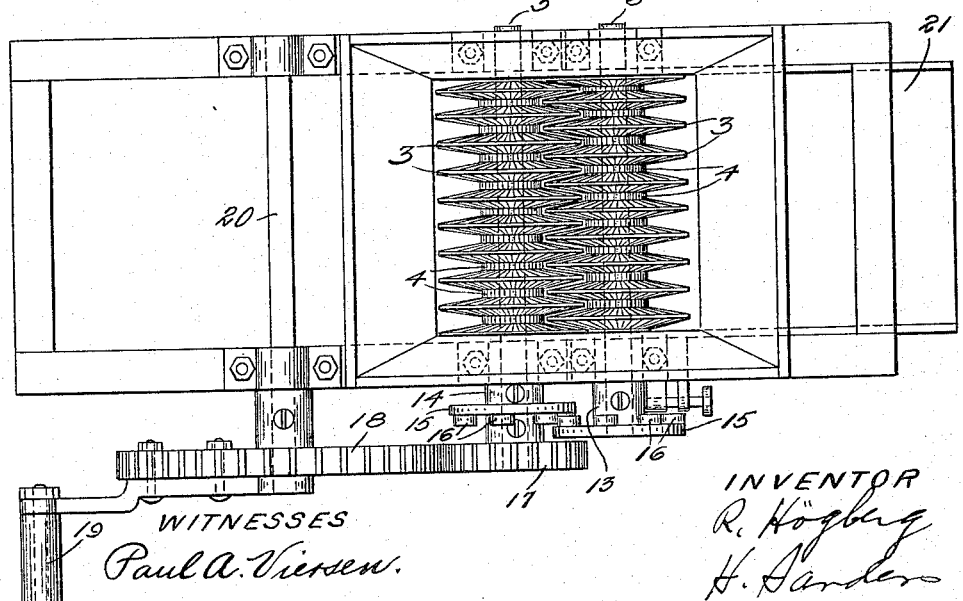
WITNESSES
Paul A. Viersen.
INVENTOR
R. Högberg
BY
ATTY.

R. HÖGBERG.
POTATO MILL.
APPLICATION FILED JUNE 9, 1913.
1,168,809.  Patented Jan. 18, 1916.
2 SHEETS—SHEET 2.
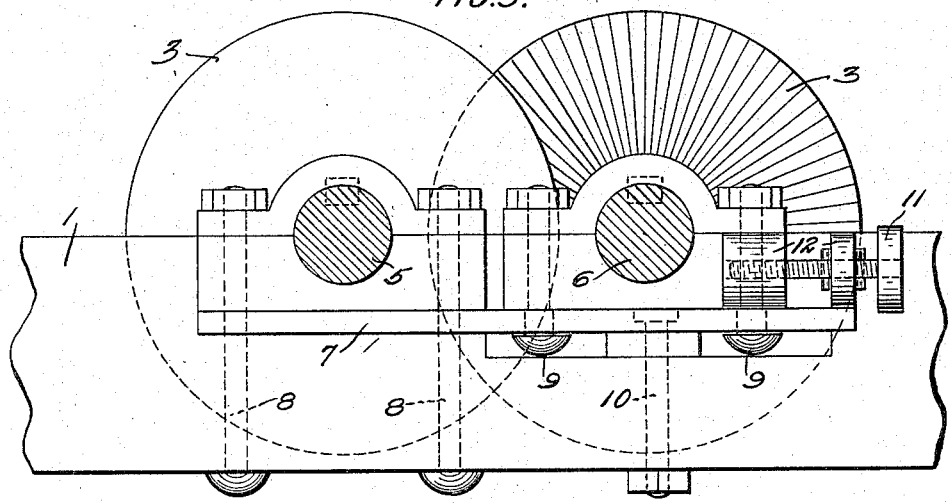
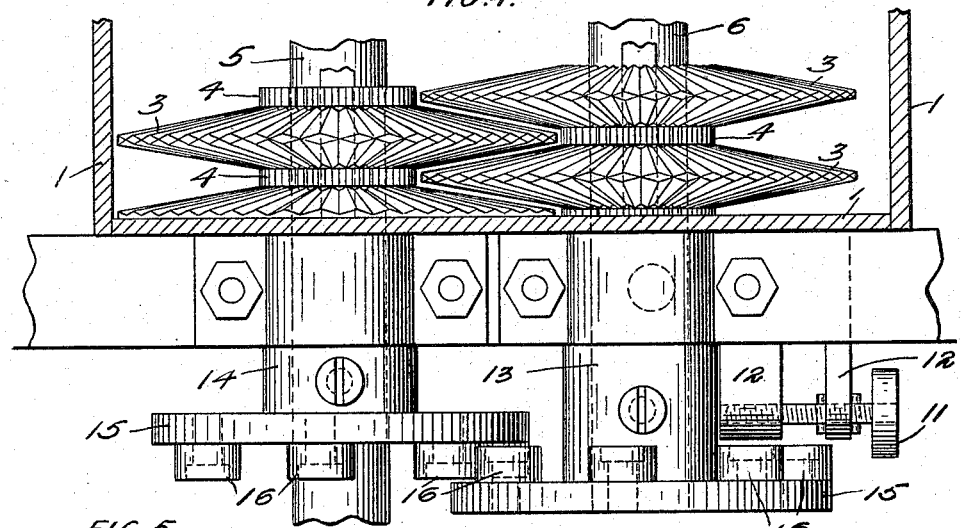
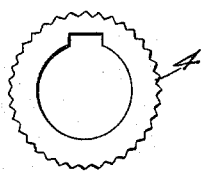
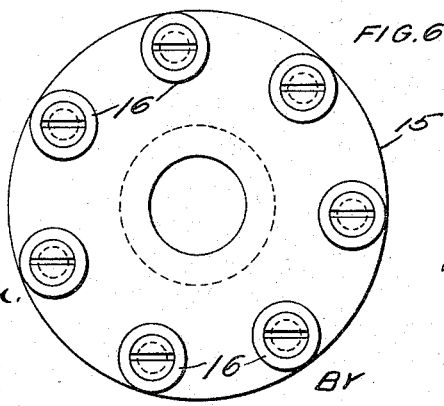
WITNESSES
Paul A. Viersen.
INVENTOR
R. Högberg
H. Sanders
BY      ATTY.
THE COLUMBIA PLANOGRAPH CO., WASHINGTON, D. C.

UNITED STATES PATENT OFFICE.

ROBERT HÖGBERG, OF BRATTBACKEN, SWEDEN.

POTATO-MILL.

1,168,809. Specification of Letters Patent. Patented Jan. 18, 1916.

Application filed June 9, 1913. Serial No. 772,674.

*To all whom it may concern:*

Be it known that I, ROBERT HÖGBERG, a subject of the King of Sweden, residing at Brattbacken, in Västernorrland and Kingdom of Sweden, have invented certain new and useful Improvements in Potato-Mills, of which the following is a specification.

This invention relates to improvements in potato mills and its object is to produce a device adapted for grinding or pulverizing potatoes from which potato flour is to be made.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a side elevation of my improved potato mill. Fig. 2 is a plan of the same. Fig. 3 is a side elevation of two of the grinders employed. Fig. 4 is a plan of Fig. 3. Fig. 5 is a side elevation of one of the grinder rings employed. Fig. 6 is a plan of one of the transmission gears employed.

Like reference characters indicate corresponding parts throughout the several views.

1 is the stand or table upon which my mill is carried and said mill comprises a hopper 2 secured to the table and within the hopper a plurality of grinder disks 3 and grinder rings 4 are disposed alternately, upon shafts 5, and 6 journaled in bearings secured upon the table 1; the grinder disks and grinder rings are so placed that the disks of one shaft coöperate in the grinding process with the rings of the opposite shaft and vice versa. The bearings of shaft 5 are firmly seated in the recessed portion of the table 1 upon a rod 7 extending lengthwise of said recessed portion and said bearings are bolted as at 8, 8 to the rod 7 and table. The bearings of shaft 6 are bolted as at 9, 9 to the rod 7, the bolts extending through enlarged openings in said rod, but said bearings are not bolted to the table; the rod 7 being bolted to the table at 10. This arrangement permits movement of the shaft 6 and its bearings with relation to the shaft 5 and its bearings thus increasing or diminishing the space between the grinding members carried by the two shafts as desired; the adjustment being effected through the medium of a thumb screw 11 carried by the apertured ears 12, 12, formed on the table and on one bearing, for engagement with the sleeve 13 of shaft 6. 14 is a sleeve disposed upon the shaft 5 and it, as well as the sleeve 13, is provided with one of the transmission disks 15, 15 each of which is provided with marginal lugs 16, the lugs of one disk meshing with those of the other and thus the sleeve 14, which receives power through the medium of a gear 17 terminally carried and engaging the drive gear 18, drives the sleeve 13 and said sleeves, of course, rotate their respective shafts. 19 is a handle connected to the shaft 20 of the drive gear 18 for rotating the same.

It will be noticed that the transmission disks are so constructed as to remain operative with any adjustment of the shafts 5, 6. The potatoes to be ground are poured into the hopper when they fall upon the grinding members and pass between the same being pulverized and from the grinding members they fall into a chute 21 and by gravitation are conveyed to a suitable receptacle.

What is claimed is:—

1. A grinding mill, including series of rotatively driven grinding disks and grinder rings, each series comprising beveled and radially toothed disks and intermediate grinder rings, the disks and grinder rings of the separate series alternately fitting in between each other.

2. A grinding mill consisting of a support, parallel shafts thereon, a series of grinding disks on each shaft, each series consisting of oppositely beveled and radially toothed disks, the disks of one shaft alternately fitting between the disks of the other shaft, grinder rings on the shafts to oppose the peripheral portions of the beveled disks, and means for operating the shafts.

In testimony that I claim the foregoing as my own I have hereto affixed my signature in the presence of two subscribing witnesses.

ROBERT HÖGBERG.

Witnesses:
J. A. HENRIKSSAN,
MARIANA HENRIKSON.

Copies of this patent may be obtained for five cents each, by addressing the "Commissioner of Patents, Washington, D. C."